July 31, 1962  G. T. RANDOL  3,046,746
HYDRAULICALLY-OPERATED BRAKE BOOSTER MECHANISM
Filed March 19, 1958  4 Sheets-Sheet 1

FIG. 1.

Inventor

July 31, 1962      G. T. RANDOL      3,046,746
HYDRAULICALLY-OPERATED BRAKE BOOSTER MECHANISM
Filed March 19, 1958      4 Sheets-Sheet 4

Inventor

United States Patent Office 3,046,746
Patented July 31, 1962

3,046,746
HYDRAULICALLY-OPERATED BRAKE
BOOSTER MECHANISM
Glenn T. Randol, 2nd and Paul Sts., Box 53,
Mountain Lake Park, Md.
Filed Mar. 19, 1958, Ser. No. 722,425
7 Claims. (Cl. 60—54.6)

The present invention relates to improvements in power-assisted actuators, i.e. hydraulic pressure-producing devices in which physical operating force is supplemented by power assistance. The improved actuator has been devised primarily for use in hydraulic brake systems on motor vehicles and the like, although other useful applications are obviously feasible.

More specifically, the aforesaid actuator comprises a hydraulically-actuated member reciprocably mounted in a double-ended cylinder, said member having independent spring action toward a normally released position and divides the cylinder into two chambers which receive the circulating fluid under minimum non-activating pressure while the member is in released position, controlled interruption of the circulation aforesaid being requisite to cause increasing buildup in pressure (activating pressures) in one of said chambers thereby causing said member to move to provide power assistance.

Novel valve control means is provided to control the hydraulic circuit in response to an operator-operated member, said valve means including a movable element exposed to the pressure working chamber of a hydraulic master cylinder forming part of the hydraulic brake system as is understood, to provide proportional pressure reaction on the operator member as a measure of the degree of braking force in effect. A normally preloaded compression spring is operably disposed in the pressure chamber between a portion of the master cylinder and the movable element to supplement the hydraulic pressure reaction on the operator member, said spring being characterized by increasing tension progressively induced by the operator member operated in a brake-applying direction. The master cylinder includes a tubular member normally in released position and having a portion projectable into said pressure producing chamber which is associated with a hydraulic fluid reservoir; a discharge port is provided for the pressure chamber; and a compensating port controlled by the tubular member when initially moved from released position serves to cut off the reservoir fluid from the pressure chamber thereby conditioning the pressure chamber to displace pressurized fluid through the discharge port via conduits into the wheel cylinders of the vehicle brakes to apply the latter as is understood.

Another special feature of the present invention is the novel utilization of a fluid reservoir integral with the hydraulic booster for supplying fluid to the hydraulic brake circuit and to the hydraulic pump, thereby eliminating a sump or supply for the pump itself to produce a self-contained unit.

An object particularly related to the object next above is the normal released position of the mechanism utilizes both of the chambers of the hydraulic power cylinder as the fluid supply, with interruption of the circulation of the fluid through the chambers being required to actuate a power-piston of the hydraulic booster in accordance with pressure applied to an operator-operated member.

It is therefore, a primary object of my invention to provide a novel hydraulic power-assisted actuator for use in vehicle brake systems, which will make braking pressure instantaneously available with instinctively predictable control measured by the manipulation of and the pressure applied to the operator-operated member, usually a brake pedal.

It is another object of my invention to provide novel means for maintaining the two chambers of the actuator filled with liquid and thereby prevent cavitation as a consequence of sudden and/or extreme movement of the fluid-actuated elements forming part of the system, or erratic functioning of the hydraulic pump.

A further important feature of my invention is a novel coaxial arrangement of a work-performing member and a reactive member operably projecting into the pressure chamber of the master cylinder aforesaid, the work member being tubular in construction and acted on by the hydraulically-actuated power-piston, while the reactive member is actuated by the operator-operated member relatively to and simultaneously with the work member, said relative operation being yieldably resisted by a normally preloaded compression spring disposed between the two members to enable closure of the compensating port aforesaid by the work member upon initial movement thereof in unison with the reactive member; whereupon, the pressure effective on the fluid within the pressure chamber and hydraulic system causes the work member movement to be substantially arrested enabling relative movement of the reactive member with respect thereto to control operative energization of the hydraulic actuator aforesaid to assist the operator member in applying the brakes. Accordingly, the compression spring is preenergized sufficiently to initially move both members as a unit to condition the hydraulic pressure chamber for operation and take up the slack in the system to place the brake shoes in contact with their respective wheel drums, thereafter the pressure buildup in the system resists further movement of the work member which induces the compression spring to yield which in turn accommodates relative movement simultaneously of the reactive member and control valve with respect to the hydraulic power-piston to operatively energize the latter according to pressure on the pedal with proportional hydraulic thrust reacting on the exposed end of the reactive member to provide the necessary "feel" to properly control the desired braking application. A further function of this spring is to return the control valve to released (open) position along with the brake pedal. A still further object of the invention is to provide a source of hydraulic pressure production in the way of a pump operated, for example, by the engine of the vehicle, or independently thereof as by an electric motor with the hydraulic circuit controlled by said valve control means.

A further object of the invention is the provision of novel one-way connecting means between the movable power assembly and work-performing member of the hydraulic motor whereby limited or full independent movement of the work member by the operator member in a brake-applying direction is available instantly and automatically in the event of power inadequancy or failure.

An object related to the object immediately above is the novel incorporation of the power control valve wholly contained within the work member in coaxial disposition with respect thereto, and use of standard components comprising conventional foot-operated master cylinders.

A modified master cylinder piston structure is provided in which novel hydraulic dashpot means are operably incorporated between the hydraulically-actuated member and a smaller coaxially disposed reactive plunger operated by the brake pedal via an element of the control valve mechanism, said plunger replacing the aforesaid reactive plunger subject to proportional hydraulic thrust created in the pressure working chamber of the master cylinder, said dashpot smaller piston carries on its head end a spring influenced check-valve member cooperating with an annular seat provided on the piston head, one side of said valve member having continuous communication with the fluid in the master cylinder reservoir and the other side being subject to the fluid carried in a dashpot chamber. A restrictive port through the valve member enables the fluid in the dashpot chamber to be slowly transferred to the master cylinder reservoir while said valve member is seated in response to relative movement of the coaxial plunger to control operative energization of the hydraulic actuator; while release of the coaxial plunger enables the dashpot chamber to fill quickly from the fluid in the reservoir due to movement of the valve member from its seat accommodated by its spring action to give a quick release of the hydraulic actuator in a brake-releasing direction. Accordingly, the novel dashpot means enable the operator to take up the slack in the brake system without the tendency of overrunning the preloaded status of the main control valve return and thrust-transmitting spring prematurely. Stated differently, this dashpot arrangement cooperates with the main valve return and thrust spring to insure that the pressure working chamber of the master cylinder is conditioned for operation prior to the power phase being made effective so that a smooth mergence of the power phase will result which eliminates power surge on the pedal. Another advantage is, that if the operator applies too much force too rapidly on the pedal when inaugurating a brake-applying operation, the dashpot acts to block relative movement of the main control valve with respect to the hydraulically-operated piston, thus preventing the valve return and thrust spring from yielding from its normally preloaded status. This "blocking" action of the dashpot transmits force to the hydraulically-operated piston from the pedal such that, if the pedal is depressed, the dashpot chamber is reduced by the flow of fluid through its control port in the valve member thereof back to the reservoir, the rate of pedal movement determining whether the fluid is trapped temporarily or discharges from the chamber in a pressurized state. In the former instance, the dashpot would transmit operator force to the master cylinder piston, while in the latter case, the dashpot would serve as a controlled reaction to pedal movement, that is, if operator pressure on the pedal exceeds the capacity of the valve member port to transfer the fluid without build-up of pressure thereon in the dashpot chamber, to the reservoir, the operator is immediately apprised that he is doing more work to apply the brakes and at the same time is delaying the effectiveness of the power phase by not overcoming the main control valve return and thrust spring. A further important feature is provided by this dashpot means enabling use of a lighter main control valve return spring than normally would be used whether the pedal pad is at a low or normal height position, since in no case can the main control valve operate to control energization of the hydraulic actuator except at a substantially fixed rate of pedal depression as to press harder on the pedal would only result in the operator setting up the brakes tighter before the power phase becomes effective since the latter operation cannot become operative until the dashpot chamber reduces by egress of the fluid through the control port back to the reservoir.

The present invention, therefore, seeks to provide in a broader patent sense, novel thrust-transmitting means between a pedally-controlled valve for a brake operating power cylinder and a pressure-transmitting member operably associated with a power member movable within the power cylinder, said means having a variable chamber which utilizes fluid as the medium of force transmission thereby from the pedally-controlled valve to said pressure-transmitting member, and include a check-valve element movable to accommodate said chamber to be charged with fluid at atmospheric pressure from a source of fluid when the pedally-controlled valve is moved to released position, and for restricting return of said fluid from the chamber to its source during actuation of the pedally-controlled valve in the opposite direction whereby the pressure-transmitting member is releasably urged in the same direction to apply the brakes.

Broadly, a further important feature of the present invention, is to provide releasable blocking means operably disposed between an operator-operated member and a movable power assembly for smoothly merging power-operation of the brakes with initial pedal actuation thereof, whereby sudden stopping of the vehicle with attendant discomfort to passengers is prevented unless such braking effect is deliberately intended by the operator suddenly applying heavy thrust against the operator member.

An object importantly related to the two objects immediately preceding is the association of novel fluid dashpot means with a return and reactive spring for the pedal-controlled movable power assembly of the hydraulic motor whereby the dashpot action and the spring action supplement each other to provide modulatory reactive forces on the brake pedal to apprise the operator of the concurrently effective hydraulic pressure applying the brakes as is understood, said dashpot utilizing the novel check valve element for controlling the action thereof in such manner that during pedal depressions to induce power-application of the brakes, the resisting action to pedal depressions is effective but upon release of the pedal, such resisting action is neutralized for rapid brake release. A further important function of the dashpot means seeks to dampen the lost-motion effect of the pedal relatively to the movable power assembly during brake-applying movements thereof when the brakes are being applied directly by the operator, whereby the hydraulic master cylinder piston or plunger, as the case may be, is given the tendency to respond substantially in unison with pedal movements to simulate the "feel" of operation were the master cylinder operated mechanically by the foot according to conventional practice. Thus, in effect, the operator would not sense in the usual degree, light and hard pedal reactions in regulating the brakes according to the conditions but rather a smooth action through the full operating range of the pedal, whereby the operator is apprised of the degree of braking effect at any given position of the pedal with the initial operation simulating the "feel" characterizing conventional pedal-operated master cylinders.

A further important feature of my invention related to the three objects immediately above is provided by the dashpot means whereby initial depression of the pedal tends to close the master cylinder relief or compensating port by slight advancement of the hydraulic power assembly prior to operative energization of the hydraulic servomotor. This highly desirable characteristic prevents power-energization of the brakes by sudden depression of the pedal as the control valve means for the servomotor is momentarily moved substantially simultaneously with the movable power assembly to provide in effect, initial foot application of the brakes as is understood. Upon the control effect of the dashpot means enabling the control valve means to move relatively to the movable power assembly, the servomotor is brought into operation smoothly to assist the foot in regulating the brakes to whatever applied condition required. And, the dashpot means aforesaid is also effective to prevent sudden initial application of the brakes by the power means since some degree of braking effect is produced via said dashpot means responsive to initial pedal depression prior to operative energization of the power means. Thus, a rapid initial operation of the pedal tends to apply the brakes directly with the power mechanism responding subsequently as a result of the dashpot means enabling relative movement of the pedal to actuate the control valve means for the power mechanism.

The present invention, therefore, provides novel and improved braking control whereby the dashpot action during pedal depressions to cause power-application of the brakes is effective to advance the power assembly sufficiently to close the master cylinder compensating port disposed slightly ahead of the flexible sealing cup on the head of the master cylinder piston in normal position, whereby hydraulic pressure is rendered effective in the brake wheel cylinders prior to opening of the control valve to operably energize the power mechanism thus preventing sudden braking applications. In this manner, the dashpot means provide smooth merging of the foot and power applying phases, thereby preventing sudden inauguration of the power phase irrespective of the mode of operating the brake pedal.

Another salient feature of my invention is the novel utilization of foot-operated hydraulic means for its operation to accommodate installation of the actuator remote from the operator station.

In a more specific sense, the present invention is adapted for installation on the firewall of the vehicle within the engine compartment for direct mechanical operation from a suspended-pedal pivotally mounted on the opposite side of the firewall in the driver's compartment of the vehicle.

Another salient feature of my invention is the provision of novel low-pedal mechanism which may be readily installed on motor vehicles equipped with suspended-pedal foot-operated brakes, the latter pedal being normally spaced five to six inches from the toe board in the driver's compartment and therefore termed a "high-pedal" brake in contrast to "low-pedal" types which place the pedal pad and accelerator pedal in substantially the same plane when released so that the driver can control deceleration and acceleration of the vehicle by merely swinging the toe portion of his foot from one pedal to the other without lifting the heel from the floorboard. This improved low-pedal mechanism is especially adapted for installation on after-market vehicles since the entire mechanism is pivotally supported on the pin formerly utilized to pivotally suspend the conventional height pedal aforesaid from its bracket. Stated differently, the present low-pedal mechanism replaces the normal height pedal and utilizes the latter's pivot pin to support a secondary support or bracket on the pedal bracket extending from the vehicle firewall into the driver's compartment provided as original equipment on present-day vehicles. The secondary bracket pivotally supports the low-pedal and linkage to the power control valve for the hydraulic motor aforesaid. Accordingly, vehicles equipped with normal height suspended-pedals may be readily converted to "low-pedal" control without altering the structure of the vehicle in any manner by merely removing the pedal and pivot shaft from the factory-installed bracket and then attach the low-pedal mechanism in operating position on this bracket with the same pivot pin. Thus, conversion from "high" to "low" pedal braking control may be readily effected for any type of firewall mounted power-brake without altering any of the original parts associated with the mounting and operation of the hydraulic master cylinder. This novel feature contemplates an adjustable linkage whereby the pedal pad may be lowered or raised to suit the driver's preference.

My invention contemplates an appreciably improved hydraulically-actuated booster for hydraulic brake systems of automotive vehicles over similar systems heretofore proposed, from the standpoint of compactness, durability, efficiency, and predictable braking control conducive to safety under all operating conditions of the vehicle and braking control responses of the driver, and wherein the "feel" of operation is substantially normal to that sensed in operating conventional foot-operated hydraulic systems.

Another important feature provided by my invention is the novel adaptation of hydraulically-operated mechanism in combination with the standard components comprising a conventional hydraulic master cylinder, to operate the cylinder with reduced pedal effort, thereby enabling "pumping" or "feathering" control on long downgrades to prevent dangerous brake "fade," and in the event of power failure or inadequacy, the cylinder may be operated "straight-through" directly by the foot pedal in the usual manner to assist the power-boost or independently thereof.

With these and other objects and advantages in view, the invention consists of the new and novel combination, construction, and arrangement of parts as hereinafter more fully described, set forth in the claims appended hereto, and disclosed in the accompanying drawings forming part hereof, wherein:

Like reference characters designate like parts in the several views with like parts in the two modifications (FIGS. 6 and 8) being distinguished, however, by the addition of the letters "a" and "b" respectively to each numeral.

Referring now to the drawings, and particularly FIGURES 1, 2, 3 and 3A, my improved hydraulic pressure-producing device or actuator generally designated "A" comprises: a hydraulically-actuated motor "HM," and a coaxial hydraulic master cylinder "MC" preferably integrated with said motor for compactness and ease of installation.

The motor HM comprises: a cylindrical casing 10 provided with an integral wall 11 at one end and the other end closed as by a detachable cover plate 12 attached to the end of the casing as by a plurality of cap screws 13 inserted through holes 14 in the marginal portion of the cover into engagement with registering threaded bosses 15 formed exteriorly on the casing 10 at its rear or right end to thus provide a double-ended motor casing. A ring-type gasket is provided at 17 between a peripheral flanged portion 18 of the cover and the confronting end of the casing 10 to effect a liquid-tight seal therebetween. The cover has an offset annular flange 9 projecting horizontally from the flange 18 into the casing 10 to support the end portion of said casing, and a similar flange 20 concentrically disposed inwardly of the the flange 19 is provided with a plurality of cross-slots, preferably two, at 22, the interior of said flange 20 forming a counterbore 23 which terminates in an internal annular groove 24 for receiving the outer lip 25 of a double-lip ring-type flexible seal 26 having an inner sealing lip 27. Centrally disposed exteriorly of the cover 12 is an integral hub 30, the exterior of which is provided with an annular groove 31 adjacent its end for the reception of a forward annular bead 32 on a flexible dust boot 33, and a longitudinal bore 35 is provided through the hub 30 of substantially the same diameter as the inner lip of the seal 26. The interior of the cylindrical casing 10 is provided with a finished cylindrical surface 36 defined by an internal annular shoulder at 37 and the cover 12, and an unfinished cylindrical surface 38 defined by said shoulder 37 and the integral end wall 11.

A power-piston assembly "PP," which is referred to elsewhere in this specification and in certain of the claims as a pressure-responsive movable wall, member or power-piston for flexibility in terminology, is movably disposed in the casing 10 for reciprocable operation within the limits of the finished surface 36, said assembly PP having a normally released position (see FIGURE 1) which defines a variable pressure or power chamber 40 and a variable liquid supply chamber 41 with respect to the covered and integral ends respectively of the casing 10. A normally preloaded compression spring 42 is operably disposed within the supply chamber 41 with one end bearing on the inside of the integrated end wall 11 and the other end reacting on the piston assembly to continuously urge the latter toward its released position aforesaid. A filler cap "FC" is provided for the supply chamber 41, said cap having an exterior annular flange 43, a reduced diameter externally threaded depending ring flange 44, a coaxial exterior embossment 45 preferably formed with a hexagonal perimeter for reception of a wrench for manual removal and installation of the cap from an internally threaded opening 46 provided in the wall of the cylindrical casing 10 into the supply chamber 41. Centrally depending from the flange 43 and concentrically disposed within the flange 44 is another depending ring-type flange 48 internally threaded for reception of an externally threaded hollow plug 49, a coaxially disposed breather passageway 51 is provided through the flange 43 and embossment 45 to the exterior, the inner end of said passageway terminating in an angular annular valve seat 52 of larger diameter, and a coaxial bore 53 through the plug terminates in a conical concavity 54 spaced from the said valve seat to provide a valve chamber 55 in which a movable check-valve element such as a steel ball 56 is positioned to cooperate with the valve seat 52 to prevent escape of liquid from the chamber 41 should a slightly pressurized condition develop, which if present would cause the ball to move upwardly and seat tightly thus closing the passageway 51. When the liquid in the supply chamber 41 is under normal non-activating flow condition, the ball drops under influence of gravity, to vent the supply chamber 41 to atmosphere thus avoiding the tendency of the piston assembly PP when operating, to create a vacuum condition within said supply chamber. Accordingly, if the supply chamber 41 becomes filled and the liquid therein slightly pressurized, the check-valve 56 in the filler cap FC is effective to restrict fluid surge and therefore prevents fluid loss via the breather passageway 51. A fluid outlet passageway 58 is provided through the end wall 11 for the supply chamber 41, said passageway extending to the exterior of said casing 10 via an internally threaded boss 59 integral with the end wall thereof which receives a threaded nut and bushing 60 for attaching a fluid return conduit 61. A fluid inlet passageway 62 is provided through the cylindrical wall of the casing 10 to the power chamber 40, said passageway 62 having an internally threaded boss 63 integral with the exterior of said casing which receives a threaded nut and bushing 64 for attaching a fluid pressure conduit 65.

The aforesaid power assembly PP comprises: a piston 70 provided with a peripheral annular flange 71 integral with the medial portion of an annular offset portion 72 exposed to the supply chamber 41. On the power chamber or opposite side of the piston 70 at the base of the flange 71 is an external annular channel 73 for reception of an inner annular lip 75 of a double-lip flexible ring-type seal 76 with its outer sealing lip 77 in liquid-tight contact with the finished surface 36 of the casing 10. Concentrically disposed within the offset portion 72 aforesaid is a cylindrical hub 79 integral with the piston 70 and extending from the opposite side of said piston is a coaxial longer hub 80 with its end engaging the flange 19 aforesaid to establish the power assembly PP in its normal released position under influence of the return spring 42. An outturned annular flange 82 terminates the end of the hub 80 to insure sufficient end surface for engaging the aforesaid flange 19. A longitudinal bore 83 is provided through the hubs 79, 80 and an annular liquid chamber 84 is formed in the bore 83 defined by internal annular flanges 85, 86 adjacent the ends of the hubs 79, 80 respectively, each of said flanges being provided with an internal annular groove 87 fitted with a piston ring 88 having its end overlapped or interlocked. A plurality of ports 89 are provided through the wall of the hub 80 for maintaining the power chamber 40 in continuous communication with the chamber 84.

The master cylinder MC comprises: a cylindrical casing 90 coaxially disposed medially of the end wall 11 of the casing 10 and preferably integral therewith. The casing 90 has a finished inner cylindrical surface 91 and is open at its inner end and closed at its outer end as by a wall 92 through which a discharge port 93 is provided. A compensating port 95 is provided through the wall of the casing 90 for maintaining the supply chamber 41 connected to the interior of this casing. A threaded hole 96 through the wall of the casing 10 is fitted with a drain plug 97 which is coaxially disposed with respect to the compensating port 95 to enable processing of this port as by inserting a drill through the hole 96.

A tubular pressure-transmitting member generally designated "PM" which is adapted to perform work, that is, pressurize the brake fluid in the master cylinder MC, has its rear portion operably projecting through the bore 83, inner sealing lip 27 and bore 35, the latter serving to slidably support the tubular member PM and power-piston assembly PP carried on the latter. Medially positioned on the exterior of the tubular member is an annular flange 98 which is engaged by the forward end of the hub 79 for movement as a unit when the power-piston PP is energized to render power-assistance which will be more fully explained hereinafter. Immediately forward of the flange 98 is a plurality of ports 99 for maintaining the supply chamber 41 connected to a longitudinal bore 101 extending to the rear end of the tubular member and which provides an internal annular shoulder at 102 defined by a reduced diameter coaxial bore 103 merging with another smaller diameter coaxial bore 104 terminating at the inner end of the tubular member PM and providing another internal annular shoulder at 105. Immediately to the right of this latter shoulder are a plurality of ports 106 through the wall of the tubular member having a reduced diameter 107 substantially the same length as the bore 103, said latter ports serving to maintain communication between the supply chamber 41 and bore 103. The tubular member PM is further provided with a threaded hole at 108 through the normal diameter wall thereof and normally positioned to the right of the ports 89 as viewed in FIGURE 1, for reception of a stop screw 109 having its inner end free of threads for an important function to be described later. A pair of diametrically disposed control openings or cross-slots 117 which intersect an internal annular channel 118 (see FIGURE 3A) is provided in the wall of the tubular member PM, spaced to the right of said stop screw 109, for interconnecting the fluid chamber 84 and bore 101, said slots may be varied in depth to accommodate the flow of fluid at non-activating pressure into the supply chamber 41.

The forward end portion of the tubular member PM terminates in an external annular flange or head land 120 which operably projects into the casing 90 to provide a variable working chamber 121 with respect to the end wall 92 for transmitting pressurized fluid through the discharge port 93 to wheel cylinders 122, such pressure on the fluid being developed jointly by the force exerted by the power-piston 70 of the hydraulic motor HM and the force exerted by the operator as will be more fully explained in the course of the description to follow. A plurality of longitudinal passageways 124 are provided through the wall of the head land 120 adjacent the periphery thereof in circumferentially equally spaced relation, said passageways 124 being controlled by a conventional star-shaped leaf spring 125 employed in conventional foot-operated master cylinders, each leg 126 of said leaf spring radiates from a central circular web segment 127 with the free ends of the legs overlying the ends of the passageways 124. Carried on the left side of said leaf spring 125 is a cup-shaped pliant seal 128 having a peripheral sealing lip 129 normally disposed closely adjacent the right side of the compensating port 95 whereby initial movement of the tubular member PM closes the port 95 to condition the working chamber 121 for operation to pressurize the liquid as is well understood. It should be noted that when the seal 128 is under pressure, the free ends of the legs of the star-shaped leaf spring tightly close the forward ends of the passageways 124 to isolate the working chamber liquid from that in the supply chamber 41.

Control valve mechanism generally designated "CV" is of new and novel construction and operation and comprises: a tandem spool-type valve element or piston 130 which is slidably mounted in the bore 101 of the tubular work member PM, said piston having two longitudinally spaced annular lands 131 and 132 with the forward edge 133 of the land 132 adapted to control the cross-slots 117 and channel 118 aforesaid to control energization of the power-piston PP by interrupting the flow of liquid to the supply chamber 41, the other land may be termed a "sealing" land since it is void of any control function with respect to the ports carried by the tubular member PM. The two annular lands aforesaid define two annular liquid chambers 135, 136 with respect to the interior of the bore 101 and shoulder 102, said chamber 135 being in continuous communication with the ports 99 and the chamber 136 communicates continuously with the control slots 117. An external annular groove 138 is provided in each of the lands 131, 132 for reception of an overlapped end piston ring 139 respectively to prevent fluid loss via these lands and therefore confine the linquid whether pressurized or not within the annular chamber 136. A reduced diameter tubular extension 141 projects from the land 131 and forms the inner wall of the chamber 135 which is variable as will appear. This extension is provided with a counterbore 142 and a plurality of ports 143 through the wall thereof to maintain the counterbore 142 in constant communication with the chamber 135. Another reduced diameter extension 144 projects from the end of the extension 141 into engagement with a reactive coaxial piston member disclosed herein as a plunger 145 slidably supported in the bore 104 with its forward end receiving reaction from the confronting end wall portion of the seal 128 in a manner replete in the art. The extension 144 is provided intermediate thereof with an external annular flange 147 which abuts the end of the extension 141, said flange being longitudinally spaced from the shoulder 105 to provide a variable fluid chamber 148 therebetween, said chamber 148 receiving a normally preloaded compression spring 150 with one end bearing on the shoulder 105 and the other end reacting on the shoulder 147 to continuously urge the control valve piston 130 toward its normally released (open) position defined by the opposite annular shoulder 151 of the chamber 136 in engagement with the inner smooth portion of the stop screw 109. Thus, said shoulder and stop screw may be termed a pair of cooperating abutment-engaging elements which serve to establish the "open" position of the valve mechanism CV. A reduced diameter portion 152 is provided on the inner end of the piston 145 to loosely pilot this piston in a suitable blind hole 154 provided in the confronting end of the extension 144 whereby the coaxial accuracy of the bores 103, 104 is not critical since this tolerance may vary to some extent since the limited disalignment of the piston 145 and control valve element 130 will prevent any tendency of binding in their respective bores aforesaid. The flange 147 is provided with a rearward tubular extension 157 having its exterior surface threaded as at 158 and a longitudinal bore 159 closed at one end and open at the other (inner) end. A normally preloaded compression spring 160 is supported at one end in the bore 159 and reacts on a preferably ball-type element 162 which movably seats on a valve seat at 163 which terminates a longitudinal liquid passageway 164 intersecting a cross passageway 165 in continuous communication with the chamber 136. The movable element 162 and valve seat 163 provide what may be termed a "check-valve" 166 having spring action in a seating (closed) direction. This check-valve serves an important control function in the operation of the present hydraulic actuator A by maintaining the liquid at a minimal pressurized condition within the power chamber 40, but not sufficiently pressurized as to overcome the biasing force of the piston return spring 42 in the piston's normally released position shown in FIGURE 1. The threaded portion 158 on the extension 157 engages an internally threaded portion 167 at the open end of the counterbore 142, and the other end thereof merges with the longitudinal passageway 164 adjacent the check-valve seat aforesaid to provide a cage for the ball 162 as shown, said counterbore being coextensive with the tubular extension 141 projecting forwardly from the valve land 131, and which provides the inner circular wall of the annular chamber 135 to thus place the spring 160, ball 162 in assembled operative relation with respect to the valve seat 163 controlled by said ball as shown.

The rear or outer end of the control valve piston 130 extends beyond the outer end of the tubular member PM, and is provided with an annular external groove 170 engaged by a split thrust ring 171 normally spaced predeterminately at 172 from the confronting rear end of the tubular member PM to establish or define the limits of the relative operating movement between the valve piston 130 and member PM whereby when said relative movement is substantially taken up, the control slots and cooperating channel 118 are fully covered and the thrust ring 171 in readiness to engage the confronting end of the tubular work member PM to enable operator force to be applied directly to said member to assist the power force in operating the master cylinder MC or independently of the power force should the latter be inadequate or fail completely. Accordingly, the thrust ring 171 and confronting end of the work member PM may be termed another pair of cooperating abutment-engaging elements which define, in conjunction with the aforesaid stop 109 and shoulder 151, the relative operating movement of the valve piston 130 from normal (open) position to operating (closed) position to control operative energization of the power-piston PP, said other elements being adapted to reach an engaged status following closure of the valve mechanism CV, to render "straight-through" operation of the work member PM effective under sole influence of operator force or in cooperation with the energized status of the hydraulic motor HM.

A socket 174 is provided in the outer end of the valve piston 130 which terminates in a counterbore 175 to receive the free end of a push rod generally designated "PR," the latter preferably having a rounded end 177 for engaging the bottom of the socket to impart relative movement to said valve piston against its spring action and also movement jointly with the tubular member PM when the thrust ring 171 is brought into contact with the rear end of said member.

A residual pressure check-valve "RV" having a cup-shaped housing 178 with openings 179 provided through its end wall 180. The open end of this housing terminates in an outturned annular flange 181 parallel to the end wall aforesaid, which movably engages a ring-type valve seat 182 engaging the inner side of the end wall 92, said check-valve assembly includes a self-contained pressure discharge one-way check-valve 183 comprising a flexible disc 184 impinged at its center between cooperating mating portions 185, 186 carried by a partition member 187 which is provided with openings 189, and the end wall 180 respectively. The flexible disc is adapted to control the openings 179 to admit pressurized liquid from the working chamber 121 into the discharge port 93 via the openings 189 to operate the wheel cylinders or motors 122 of the wheel brakes generally designated "WB" as is well understood in the art.

A normally preloaded compression spring 190 is preferably disposed within the working chamber 121 with one of its ends reacting on the outturned flange 181 of the residual pressure valve RV and the other end reacting on a cup-shaped seat member 191 which is turn bears on the vertical or end wall 192 of the seal 128 whereby the flanged portion of the residual valve RV is urged to engage the seat 182 and the coaxial hydraulic pistons 70, 145 toward their respective released positions defined by the end of the hub 80 in engagement with the annular flange 20 on the inside of the cover 12, and the valve shoulder 151 in engagement with the stop screw 109 aforesaid. This spring is characterized by providing increasing tension progressively induced by the operator as will appear, and also the additional function of acting on both pistons 70, 145 in a brake-releasing direction but effective on the reactive piston 145 only in a brake-applying direction so that none of the power force is required to overcome this spring.

Figure 1:
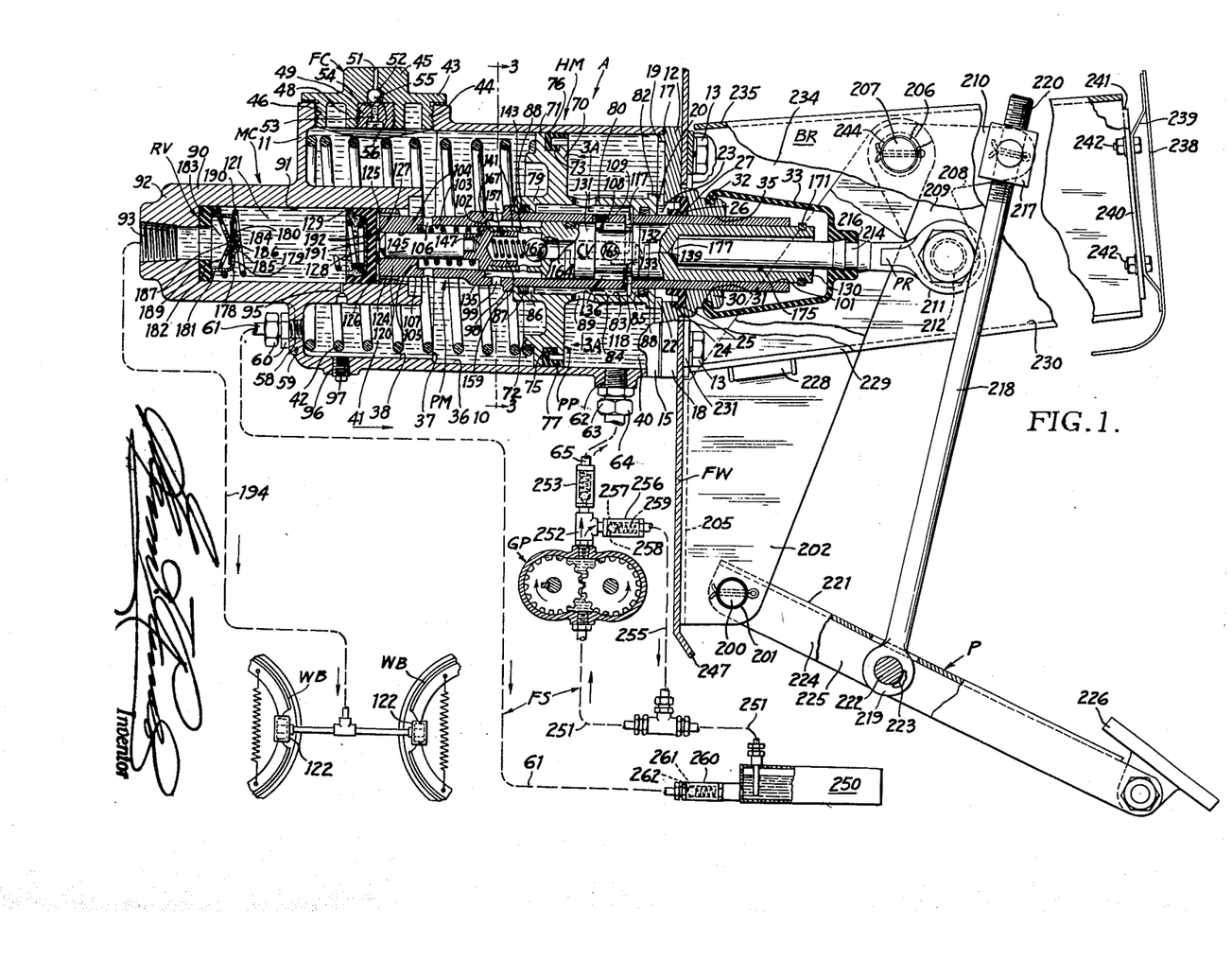
FIGURE 1 is a schematic view including a longitudinal section partly in side elevation of my improved hydraulically-actuated pressure-producing system constructed in accordance with the present invention, and exemplarily shown connected diagrammatically to operate a hydraulic brake system conventionally employed on automotive vehicles and the like with the brake system shown in released condition.

The discharge port 93 of the master cylinder MC is connected by a branched hydraulic line or conduit 194 to one or more of the hydraulically-actuated wheel cylinders 122, the latter being commonly employed to operate the wheel brakes WB of motor vehicles and the like as exemplarily demonstrated in FIGURE 1.

Figures 2, 3, 7:
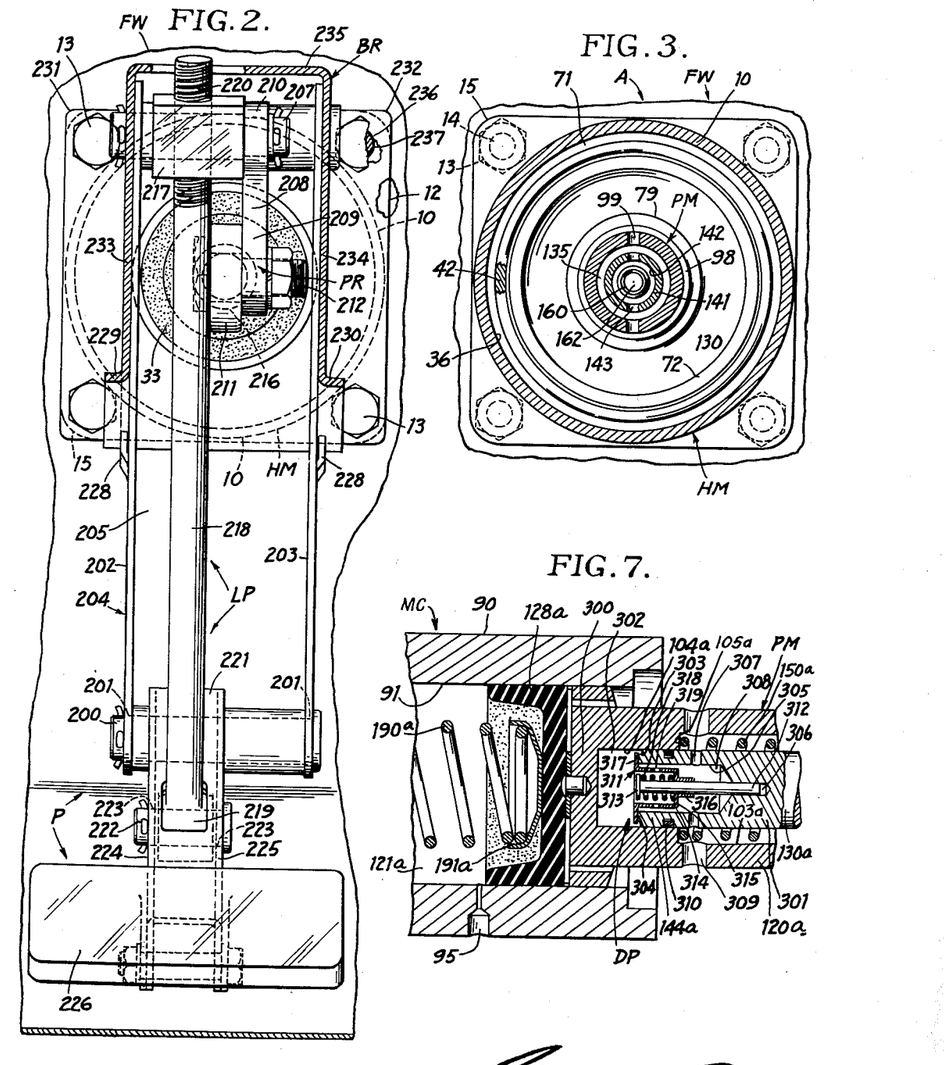
FIGURE 2 is a rear elevation of the hydraulic motor and associated low-pedal linkage system for controlling said motor.
FIGURE 3 is a transverse sectional view taken along the line 3—3 of FIGURE 1 showing the fluid supply side of the power assembly and associated parts of the thrust member and control valve.
FIGURE 7 is a fragmentary sectional view taken from FIGURE 6 showing the dash pot structure on an enlarged scale for clarity of detail.

Suspended low-pedal mechanism generally designated "LP" of novel construction is provided as best shown in FIGURES 2 and 3 to enable the operator to apply force to actuate the tubular member PM jointly with the hydraulic acting force aforesaid or independently thereof should hydraulic power assistance be insufficient or fail completely. The mechanism LP comprises: a pedal "P" pivotally supported on a shaft 200 carried in registering holes 201 in the legs 202, 203 on the lower end of a supporting bracket 204 of vertical U-shaped cross section having an interconnecting web portion 205 in juxtaposition with respect to the inner side of the vehicle firewall "FW," and extending upwardly at an angle to said web portion is a continuation of the legs 202, 203 at the upper end of which aligned holes 206 for the reception of a cross shaft 207 on which a double arm lever 208 is pivotally mounted between said legs. The lever 208 has a depending arm 209 and an arm 210 angular to the depending arm. The end of the arm 209 is pivotally connected to the push rod PR as by a yoke 211 and a shouldered hex-headed pivot pin 212, and an external groove 214 spaced forwardly from the yoke 211 receives the rear bead 216 of the dust excluding boot 33 whereby the boot flexes to accommodate reciprocable movement of the push rod to actuate the control valve CV as is well understood. The end of the other arm 210 is provided with a swiveled threaded block 217. An angularly disposed connecting rod 218 having an eye or yoke end 219 at its lower end and a threaded portion 220 engaging the threaded block to terminate its upper end, serves to interconnect the arm 210 and a pedal shank 221 of generally inverted U-shaped configuration as by cross pin 222 journaled in aligned holes 223 provided in the lower ends of legs 224, 225 of the pedal shank, the latter having an angularly adjustable food pad 226 on the end remote from the pivoted end aforesaid. A laterally projecting lug 228 is outwardly extruded from each leg of the bracket 204 to bear on the lower side of substantially horizontal outturned flanges 229, 230 forming the lower marginal edge of a generally U-shaped bracket "BR" in inverted disposition, said bracket being of conventional construction with vertical outturned end flanges 231, 232 respectively forming the forward ends of legs 233, 234 interconnected on their upper ends by a web segment 235. The flanges 231, 232 have holes 236 which register with holes 237 in the firewall FW and the holes 14 in the cover 12 of the motor casing 10 so that the cap screws 13 may serve the triple purpose of securing the front end of the bracket BR to the driver side of the firewall FW, the motor cover 12 on the casing 10 and mount the entire assembly A on the engine side of the firewall FW in operating position as demonstrated in FIGURE 1. The rear end of the bracket is rigidly connected to a portion of the vehicle dash panel shown at 238 as by a bracket 239 attached to the inside of the panel as by welding and end lateral flanges 240, 241 terminating the legs 233, 234 secured to the bracket by bolts 242. The bracket 204 and lever 208 are supported on the cross-shaft 207 which in turn is journaled in aligned holes 244 in the legs 233, 234 of bracket BR. The three pivot pins 200, 222 and 207 are headed on one end and prevented from axial displacement by cotter pins through the other end as shown in FIGURE 1.

Pressure applied by the operator on the foot pad 226 is via the pedal linkage LP to the connecting rod 218 to rotate the lever 208 in a clockwise direction as viewed in FIGURE 1 and thus cause the push rod PR to be moved leftward to apply the brakes as will be more fully explained hereinafter. The threaded connection of the connecting rod with the block 217 provides for adjustments in the height of the pedal pad 226 from the toe board 247 in the driver's compartment. A further important feature resides in the easy conversion of conventional suspended-pedal brackets for foot-operated master cylinders mounted on the vehicle firewall on the engine side thereof to accommodate a low-pedal arrangement as illustrated in FIGURE 1 by merely removing the conventional pedal pivot pin at 207 and substituting the bracket 204, linkage and lever arrangement shown in FIGURE 1 for the conventional suspended pedal, said pivot pin when replaced in the bracket BR supports the entire pedal assembly in operating position without having to alter the bracket BR in any manner since it is clear that the lever 208 replaces the conventional suspended-pedal and the new and novel pedal arrangement LP is supported in operating position solely by the pivot pin which formerly supported the conventional normal height pedal.

A fluid circulating system generally designated "FS" will now be described for pressurizing the fluid to actuate the hydraulic motor HM.

The circulating system includes a hydraulic circuit having an interposed pump disclosed herein as the gear-type and generally designated "GP," which draws hydraulic fluid from its supply sump or reservoir 250 through an intake conduit 251 connected to the inlet side of the pump as shown in FIGURE 1, said fluid being delivered through the outlet side of the pump into a discharge conduit 252 via a check-valve 253 having spring action in opposition to the flow of the fluid, to maintain the power chamber 40 filled to the fluid pressure conduit 65 into the power or pressure chamber 40. This liquid in the normally released position of the piston assembly PP shown in FIGURE 1 passes through the various control valve ports and passageways via the check-valve 166 into the supply chamber 41 and returns to the sump 250 via the return conduit 61. The various ports and passageways in the control valve CV being of sufficient size as to enable circulation of the fluid from the gear pump through the power and supply chambers 40, 41 back into the sump 250 with only a minimum accumulation of pressure insufficient to actuate the power-piston PP of the motor HM. However, when pressure builds up in the power chamber 40 as a result of interrupting the aforesaid substantially free circulation of the fluid through the control valve CV, the piston PP moves to the left from its normal released position in FIGURE 1 which movement applies pressure on the brake fluid confined in the working chamber 121 of the master cylinder MC to operate the brakes in usual manner. During this pressurized condition of the liquid in the circulating system, excess liquid is returned to the sump 250 via a shunt conduit 255 in which is incorporated a pressure regulator valve 256 having a movable element 257 biased to seated (closed) condition with respect to a cooperating seat 258 by a normally preloaded compression spring 259. The tension on this spring establishes the working pressure of the liquid transmitted into the power chamber 40 to actuate the motor HM. The return conduit 61 includes a one-way check-valve 260 having a movable element 261 spring biased into seating (closed) relation with a valve seat 262, said spring acting on the element 261 in opposition to the return flow of said liquid to establish a minimum pressure in the circulating system when the motor HM is inactive to prevent cavitation in the circulating system aforesaid.

OPERATION

Operation of my improved hydraulic-booster mechanism A will be apparent from the foregoing description but may be summarized as follows:

Assuming that the device A is installed on a motor vehicle as the present disclosure exemplarily demonstrates in FIGURE 1, to operate the hydraulic brake system commonly employed on such vehicles, is in released "brake off" condition as depicted in this figure. With the engine running and the gear pump GP, for example, driven thereby to draw the fluid from the supply sump 250 into intake conduit 251, thence circulating it through pressure discharge conduit 252, check-valve 253, pressure conduit 65, pressure chamber 40, ports 89, annular chamber 84, control slots 117, channel 118, annular chamber 136, cross passageway 165, passageway 164, check-valve 162, bore 142, ports 135, annular chamber 135, ports 99, supply chamber 41, return conduit 61, check-valve 260 back into the supply sump 250 for recirculation as is understood. The hydraulic actuator or motor HM is now conditioned for operative energization which is accomplished by the operator pivoting the pedal P in a clockwise direction about its pivot point 200 which imparts a leftward movement through the interconnecting linkage and lever 208 to the push rod PR. This initial pedal movement places the tubular member PM and control valve piston 130 in the operated position shown in FIGURE 5 wherein the control shoulder 133 of the working land 132 has almost lapped or closed the control slots 117 and channel 118 to interrupt fluid circulation through the system FS and thereby cause pressure to build up in the power chamber 40 to actuate the piston assembly PP leftward from its normally released position which advances the hydraulic pressure head 120 further into the cylinder 90 to first close the compensating port 95 and then create pressure on the liquid confined in the working chamber 121 to displace it through the check-valve 180 and discharge port 93 into the hydraulic lines to actuate the wheel cylinders 122 to apply the wheel brakes WB in a well known manner.

Figures 3A, 5:
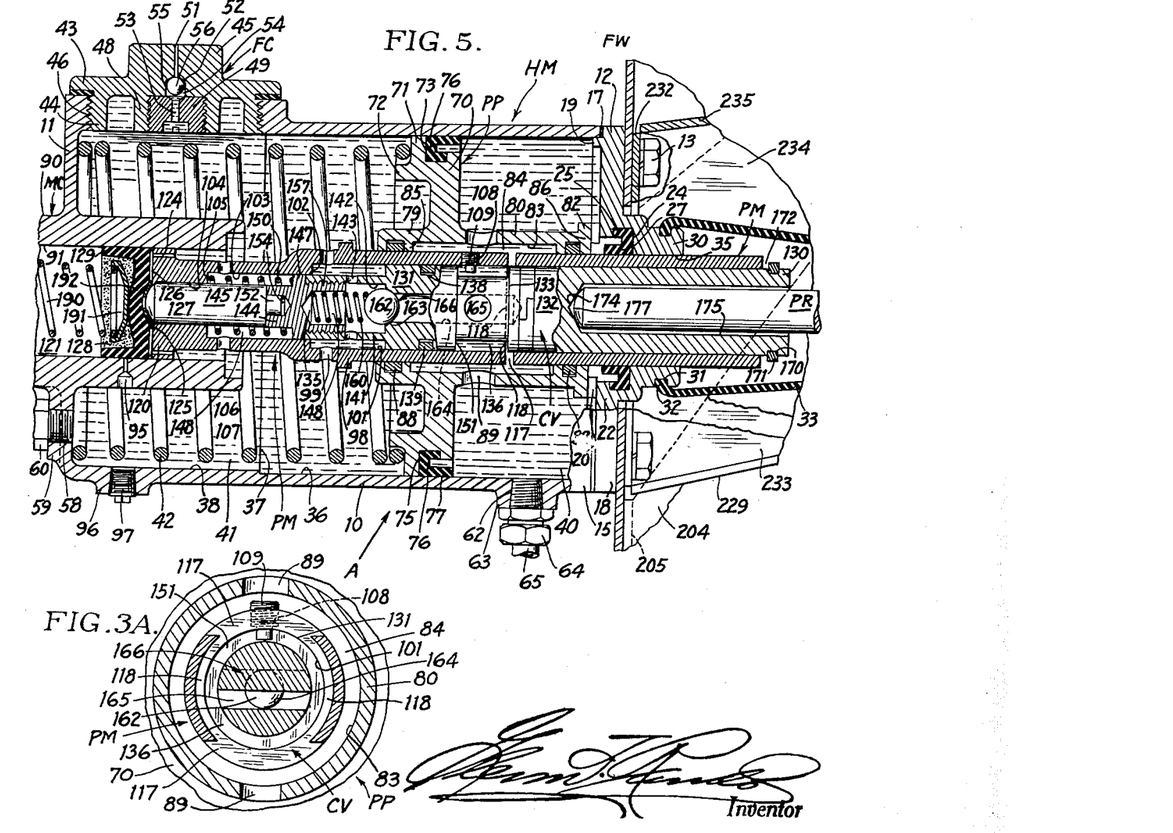
FIGURE 3A is another transverse sectional view taken on an enlarged scale along line 3A—3A of FIGURE 1 showing a fragmentary portion of the pressure side of the power assembly and associated control valve mechanism.
FIGURE 5 is a longitudinal sectional view of the hydraulic pressure-producing mechanism per se shown in FIGURE 1 with the parts operated to effect initial buildup of pressure on the brake fluid in the brake system.
Figure 4:
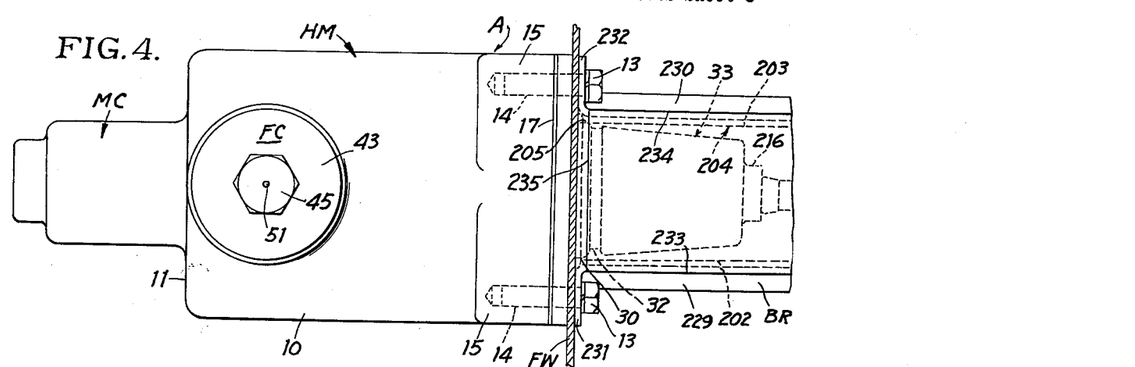
FIGURE 4 is a top plan of the hydraulic pressure-producing mechanism per se corresponding to FIGURE 1 disposition.

It is important to observe that during the aforesaid initial pedal movement, that the pressure-transmitting member PM reactive piston 145 and control valve piston 130 are moved simultaneously initially to the relative position with respect to the tubular member PM shown in FIGURE 5 by virtue of the preloaded strength of the valve piston and sleeve return spring 150. This joint movement of the three above identified parts, closes the compensating port 95 to condition the master cylinder chamber 121 for operation to pressurize the liquid therein without disturbing the normal released position of the power-piston PP shown in FIGURES 1 and 5. Upon energization of the hydraulic piston assembly PP, it moves to the left as viewed in FIGURE 5 opposed by its return spring 42 to engage the end of the forward hub 79 with the annular flange 98 and thus apply pressure to said tubular member PM to provide power assistance in applying the brakes by pressurizing the fluid in the working chamber 121 by the piston head 120 with proportional pressurizing action being effected by the coaxial reactive piston 145 actuated by the pedal P via the control valve piston 130 and push rod PR. Thus, the flange-hub arrangement aforesaid may be termed a "one-way" thrust connection enabling the power-piston 70 to act on the work performing member PM in a brake-applying direction only which eliminates the force of the return spring 42 against the pedal thereby reducing operator effort to condition the motor HM to assist in the braking effort.

During this "brake-applying" stage, the check-valve 260 is effective to maintain the supply chamber 41 filled, thus preventing cavitation, and the pressure regulator valve 256 will open and return to the supply sump 250 any excess liquid over and above a predetermined operating pressure required for maximum braking effect.

A proportional pressure within the working chamber 121 is transmitted via the reactive piston 145 to the control valve piston 130, push rod PR, lever 208, link 218 to the pedal P to provide the operator with physical perception of a proportional amount of the braking force in effect at any given position of the pedal so that foot pressure may be regulated to meet the braking condition required to simulate pressure requirements normally applied to conventional foot-operated master cylinders.

The usual followup valve control is provided by the operating relation between the control shoulder 133 on the working land 132 and the control slots 117 and channel 118 in the tubular member PM, said channel serving to maintain balanced fluid conditions around the control valve land 132 when the fluid is pressurized to actuate the motor piston 70.

In the positions shown in FIGURE 5, it will be noted that the shoulder 133 has been moved relatively to the slots 117 to overlap these slots thus enabling the liquid in the power chamber 40 to be pressurized, but if the pressure on the pedal P is halted at this point, the energized condition of the hydraulic motor piston 70 tends to slightly advance it and thus uncover a slight portion of these slots to enable pressurized circulation of the fluid from chamber 40 to chamber 41 via the check-valve 56 to establish the "poised stage" of the actuator A wherein the pressures in the power chamber 40 and those in the working chamber 121 and hydraulic lines to the wheel cylinders 122 are in substantial equilibrium and, as a result, the brakes are held "on" by light pressure on the pedal P.

The foregoing operational description completes what may be termed the "applied stage" and the "poised stage." With the brakes in applied condition and the operator desires to release them, he merely has to release the pedal P. Under such conditions, the pressurized fluid in chamber 40 is vented into chamber 41 by virtue of the retraction of the control valve piston 130 under influence of its return spring 150 relatively to the tubular member PM until the shoulder 151 engages the stop screw 109. As the control valve piston 130 retracts in accordance with the releasing of the pedal P, the control slots 117 uncover so that the pressurized condition of the fluid in chamber 40 is relieved via the check-valve 162 and chamber 41 whereby normal circulation of the system FS is resumed under the conditions previously explained. During this relieving of pressure on the fluid, the piston return spring 42 urges the piston back to its normally released position wherein the end of the hub 80 is engaged with the flange 20 on the inside of the cover 12. The installed tension of this spring should be sufficient to prevent movement of the motor piston 70 under 3–5# minimum pressure when in released (non-operating) position as demonstrated in FIGURE 1.

Due to the exactness of the followup action of the control valve CV and the ever present reaction from the reactive and return spring 190 on the pedal P supplemented by the hydraulic thrust on the piston 145, there is never any tendency of the power phase to "over-brake" at any given position of the pedal movement which contributes the highly desirable feature of smooth stops at low vehicular speeds with instinctively predictable control. At higher speeds dangerous "grabbing" or "locking" of the vehicle ground wheels is prevented thus producing smooth vehicular deceleration with reduced operator effort, in accordance with the pressure applied on the brake pedal P.

The hydraulic working chamber 121 being conventional in construction and operation, enables the operator to "pump" the brakes to prevent dangerous brake "fade" whether the power phase is effective wholly, partially or not. Thus, on long downgrades the operation of the brakes may be carried out in cooperation with power assistance or independently thereof in the usual manner by "pumping" the pedal P to introduce more liquid from the reservoir 41 via the headland passageways 124 and leaf spring valve 125 past the lip 129 of the seal 128 into the pressure working chamber 121, such movement of fluid from the chamber 41 being induced by a temporary vacuum condition created in the chamber 121 by virtue of reciprocating the head land 120 through the pumping action on the pedal P.

When pressure on the peal P is removed, springs 42, 190 and 150 react to reset the hydraulic pistons 145, 70 and associated working parts in their respective fully retracted or released positions shown in FIGURE 1 wherein the relative operating movement provided by space 172 between the control valve piston 130 and tubular member PM is re-established. It is important to note here that in the releasing operation aforesaid to take the brakes "off," the springs 190, 156 first urge the reactive piston 145 and valve piston 130 simultaneously to reset normal positions shown in FIGURE 1 with respect to the tubular member PM and then spring 190 acts on the tubular member in cooperation with return spring 42 to reset this member and the piston assembly PP to their respective released positions. Thus, at the latter stages of the return movement of the various parts of the actuator A, all three of these springs are cooperating to rest the mechanism for another brake-applying cycle. Accordingly, it is seen that the three springs above-mentioned possess novel interaction to provide reaction on the pedal P from two of them in a brake-applying direction of movement and when the pedal is released, they team up to restore the working parts of the device A to their respective normally released positions by providing the operator with an awareness of a progressively diminishing rate of reaction simulating the releasing operation of a pedal-operated master cylinder devoid of power assistance and commonly employed as the actuator for conventional hydraulic braking systems.

During the return stroke of the hydraulic motor HM, a predetermined pressure is retained in the hydraulic brake lines by means of the conventional residual pressure check-valve RV. If the pressure in the working chamber 121 falls below atmospheric pressure during the releasing of the brakes, liquid is drawn through the passageways 124 from the supply chamber 41 past the lip of the cup seal 128 into the working chamber 121 to maintain said chamber filled. When the brakes are fully "off" or released as shown in FIGURE 1, the residual check-valve RV influenced by the spring 193 will establish the minimum residual pressure in the hydraulic lines, such as, for example, 5 to 10 p.s.i., and any excess liquid in the system returns through port 95 and vice versa if additional liquid is required in the system. Therefore, the port 95 is termed a "compensating" port since the volume of liquid in the working chamber 121 and hydraulic brake lines and wheel cylinders after the brakes are fully "off" is adjusted through this port to a filled status at the minimum prescribed residual pressure in readiness for another brake-applying cycle as previously described.

If the power phase, that is, should the motor HM become disabled or inadequate for any reason, sufficient pressure may be applied on the pedal P to actuate both of the hydraulic pistons in the master cylinder MC in the well known manner with increased operator effort, however, being required as is understood where the pedal mechanism is the sole actuating medium for the brakes. This operator control of the master cylinder MC is effected by taking up all of the relative operating movement 172 between the control valve piston 130 and tubular member PM wherein the thrust ring 171 engages the end of the tubular member PM to operate it in unison with the valve element in a brake-applying direction. Thus, my improved hydraulically-actuated booster device A may be operated in the usual pedal fashion with no additional force required over that normally employed in operating a substantially low-pedal foot operated hydraulic braking system devoid of power assistance.

My improved hydraulic device A is designed primarily for use as a brake actuator, such as found on motor vehicles and the like, and which are preferably operated by a suspended-type pedal or treadle rather than a conventional brake pedal extending through the toe board of the floor in the driver's compartment. Use of the pendant-type pedal mechanism, the brake control member thereof simplifies control of the brakes since the device A can be readily installed on the engine side of the vehicle firewall for accessibility and at the same time enables movement of the pedal foot pad by the toe portion of the operator's foot for a more natural control over the braking pressure desired. That is to say, the pedal pad sweeps in substantially the same arc of travel as the foot flexes from the heel as a pivotal point to give a natural and controllable force effect on the pedal as contrasted with a leg thrust which would apply more force with less control resulting in erratic braking applications.

Pedal movement is kept within comfortable operating limits as the only additional movement required over that normal to foot-operation of the master cylinder MC, is the relative operating movement between the control valve piston 130 and pressure-transmitting member PM. This movement may be varied according to the sensitivity of the hydraulic power piston 70 desired, by varying the width and/or depth of the control slots 117 which, if reduced, the movement of the pedal is correspondingly shortened proportionately while a larger slot area would contribute to a corresponding proportionate increase in pedal movement. However, it should be appreciated that if the control slots are too small in area causing the flow of liquid to be too restricted, this would tend to slow the "on" and "off" action of the motor HM with consequent dragging of the brakes in a releasing direction and delayed applications which could hamper safety of vehicular control.

So, in order to provide quick release and controllable application of the brakes, the control slots 117 may be quite narrow yet providing ample area for a suitable rate of flow of liquid therethrough while the working edge 133 of the land 132 need only be incrementally actuated to effect the necessary followup control over the action of the hydraulic power piston 70. A further novel advantage derived from this novel control slot arrangement in the tubular member PM is that it provides a relative sensitive working movement of the control valve piston 130 enabling additional operator force to be applied to the pistons 70, 145 without noticeable transition from foot-power operation to physical force over power force. In the present apparatus, a satisfactory ratio between operator and power force is provided with the operator doing about twenty-five percent of the braking effort with the remaining seventy-five percent provided by the motor HM to produce the total brake operating force. But, should this division of work be found inadequate, the operator may instantly and automatically supplement the full operating force of the motor HM with whatever additional pressure as may be required via the "straight-through" action on the pedal P to pick up the tubular work member PM in the manner previously described. Therefore, normally the present invention operates with power over physical effort in substantially the ratio given above while in the latter instance, the physical effort may exceed the full effectiveness of the power phase to insure adequate braking force to meet what may develop to be an emergency or sometimes termed a "panic" stop of the vehicle.

It is especially important to discuss the following considerations relative to the valve return spring 150, since this spring plays an important role in the blending of the operator phase with the power phase for smooth braking applications. In the FIGURE 1 disclosure, the work-performing member PM is capable of being moved in a brake-applying direction independently of the hydraulic piston assembly PP which during initial pedal movement is yieldably maintained in its normal released position by the return spring 42. Initial movement of the pedal P moves the control valve piston 130 and work member PM simultaneously relatively to the power piston assembly PP through the preloaded tension of the spring 150 which has been found to produce the desired effect when weighted at 25 to 30# when installed. Spring 190 reacting on the hydraulic piston 145 is also concurrently additionally compressed during such initial movement of the pedal to condition the working chamber 121 for operation by closing the compensating port 95 best demonstrated in FIGURE 5. This stage of pedal movement is transitory as depicted by the first dashed line position of the pedal pad in FIGURE 1. Increasing pressure on the pedal pressurizes the liquid in the working chamber 121, hydraulic lines and wheel cylinders to place the brake shoes into contact with their respective wheel drums but not sufficiently to create actual braking or stopping force of the brakes. This initial pressurized condition of the liquid in the master cylinder MC resists further movement of the hydraulic pistons 120, 145 into the hydraulic cylinder when the pressure substantially equals the preloaded tension of the spring 150 thus causing this spring to yield and the control valve piston 130 move relatively to the work member PM to close the control slots 117 and thereby interrupt the normal circulation of the fluid to effect buildup of pressure on the liquid in the power chamber 40 to energize the power-piston assembly PP to move leftward against spring 42 to engage the thrust shoulder 98 on the tubular pressure-transmitting member for power assistance in stopping the vehicle. If, however, the power-piston assembly PP is rigidly attached to the tubular member PM, as the present invention contemplates, spring 150, to accomplish the foregoing initial operation to condition the master cylinder MC for operation, would have to be preloaded heavier to also overcome the reaction from the spring 42 on the motor piston 70 which would increase pedal load to such a degree that may not meet with public favor. An optional preloaded tension on the spring 150 would find public acceptance, however, by lowering the installed weight below the 25 to 30# so that initial pedal movement would accommodate immediate relative movement of the control valve piston 130 to energize the power-piston assembly PP to first close the compensating port 95 and then pressurize the liquid to operate the brakes with progressively increasing reaction on the pedal transmitted by the spring 190 and hydraulic piston 145 as a measure of the braking force in effect at any given applied position of the pedal P. In this latter arrangement, spring 150 would be preloaded at a lower tension than the spring 190 normally installed at about 12# to establish the residual pressure in the braking system as previously explained, so that this latter spring would oppose the spring 150 to accommodate the above initial relative movement of the control valve piston 130. In the former arrangement the master cylinder is conditioned for operation by initial movement of the pedal P while in the latter arrangement initial movement of the pedal controls energization of the hydraulic motor piston 70 which in turn conditions the master cylinder for operation. In either arrangement, the power-piston assembly PP may move relatively initially to the work member PM to provide power assistance or, as the invention contemplates, the power-piston assembly PP may move simultaneously with the work member PM to render such assistance while in either instance, the preloaded weight of the spring 150 governs whether the operator or hydraulic force inaugurates the pressure buildup in the master cylinder MC.

Accordingly, it is seen that by varying the preloaded tension of the spring 150 different operational sequences between the operator and the motor HM may be had according to the mode of operation desired for the particular installation involved. Further considering the reactive forces effective on the pedal P, it is important to observe that the magnitude of the reduced hydraulic reaction exerted on the pedal by the pressurized braking fluid via the head end of the reactive piston 145 can be varied in accordance with the diameter of such element. However, this reduced reactive force will always be proportional to the force with which the brake shoes are frictionally applied to the vehicle brake drums, to provide the operator with accurate sensing of the amount of braking force being applied. This hydraulic reactive principle is in sharp contrast to the control characteristics provided by the spring 190 against which the control valve piston 130 is adjusted to control operative energization of the hydraulic motor HM since resistance to depression of the pedal P increases in direct proportion to the distance it is depressed rather than pressure conditions to which the piston 145 is subjected. Therefore, such spring resistance alone would not necessarily have a magnitude correlated with the amount of braking force in effect for every position of the brake pedal with the added disadvantage of pedal-load increasing to an undesirable degree toward the end of the full operating stroke of the motor HM. As this spring is additionally compressed above its normally preloaded status which is limited by virtue of utilizing it to also control the residual pressure valve RV, the latter serving to establish a minimum hydraulic line pressure of approximately 8–12 p.s.i. when the brakes are "off," it provides increasing resistance to pedal movement up to the point of the braking fluid becoming pressurized, and thereafter, resistance becomes substantially constant as a consequence of the substantially stationary condition of the pressure-applying parts such as the tubular member PM resulting from the non-compressible column of fluid. Accordingly, the reactive forces from the spring 190 and piston 145 are teamed together with the piston supplying the major portion of these two diminutive reactions as a measure of the amount of braking force in effect at any given position of the pedal P at which the fluid is pressurized along its full operating stroke while the spring reactive force becomes substantially constant at the point the fluid reaches a pressurized state. Spring 190 also combines with the valve return spring 150 and the hydraulic piston return spring 42, to return the valve parts and motor piston 70 to their respective released positions shown in FIGURE 1, yet spring 190 does not hinder movement of the motor piston 70 in a pressure-producing direction since this spring is operated ahead of the work-performing member PM while the motor HM is energized.

Figure 6:
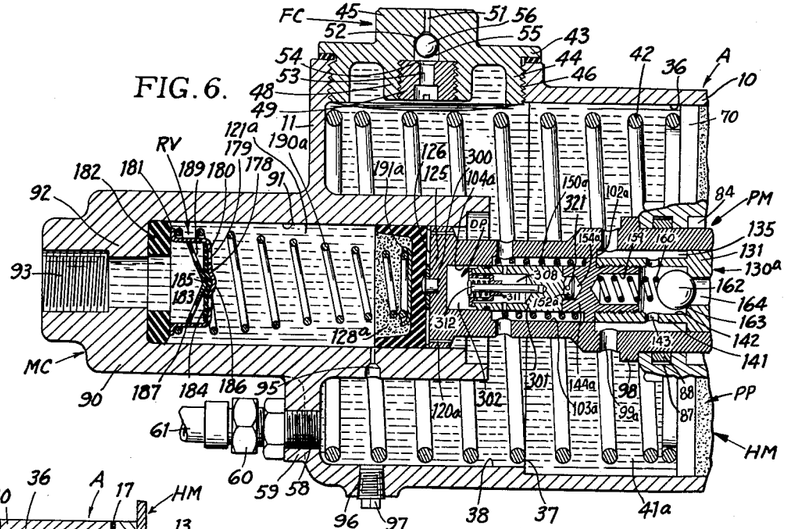
FIGURE 6 is a modified master cylinder construction wherein reaction on the hydraulic coaxial piston is eliminated, and instead, a hydraulic dashpot is provided between said hydraulic piston associated with an element of the control valve and a closed end of the bore in the master cylinder primary piston.

Hydraulic Dashpot Control of Control Valve
(FIGURES 6 AND 7)

FIGURES 6 and 7 illustrate a modified form of my invention in which the bore 104a at the forward end of the work-performing member PM is closed by an end wall 300 to provide a solid piston head on the hydraulic piston 120a whereby the cup seal 128a transmits reaction from the spring 190a via its spring seat 191a to the head end of the work member PM only. Therefore, this spring serves as a return and residual pressure regulating means since its reaction on the piston 145 has been nullified. Slidably mounted in the bore 104a is a hydraulic piston 301 with its rear reduced end 152a piloted in the blind hole 154a in the forward end extension 144a on the control valve piston 130a and the forward end of the piston projects into the bore 104a to provide a hydraulic dashpot "DP" having a variable chamber 302 with respect to the end wall 300.

The head end of the piston 301 is provided with an offset at 303 to form an annular valve seat 304, and a longitudinal counterbore 305 merges with a blind end smaller coaxial bore 306, and a plurality of passageways 307 extend through the wall of the counterbore in continuous communication with an annular chamber 308 longitudinally spaced rearwardly of the head end of said piston, and another passageway 309 is provided through the wall of the bore 104a for maintaining the annular chamber 308 in communication with the supply chamber 41a. A piston ring 310 is provided in an annular groove 311 intermediate the head end and annular chamber 308 of said piston 301 to effect a liquid-tight seal with respect to said bore 104a whereby the dashpot chamber 302 receives and discharges the liquid therein via a cup-shaped valve element 311 slidably mounted on a support stem 312 provided with a forward annular flanged end 313 and the rearward normal diameter portion being pressfitted into the bore 306 for movement as a unit with the piston 301, said movable check-valve element 311 having a cylindrical body portion 314 closed at its rear end by a wall 315 centrally apertured at 316 through which the support stem 312 projects and the forward open end of said body portion terminates in an outturned annular flange 317 in parallel relation to the end wall thereof to overlie the aforesaid annular valve seat 304 and cooperate therewith under influence of a normally preloaded light compression spring 318 operably disposed within the body portion in encircling relation with respect to the forward portion of the support stem, between the flange 313 and end wall 315. The wall of the body portion 314 is provided with a metering control port 319. A cross pin 321 through the piloted end of the piston 301 couples the latter to the control valve piston 130a for axial movement as a unit.

In operation, operator pressure on the pedal P is transmitted to the control valve piston 130a via the push rod PR. Resistance provided by the dashpot chamber 302 to rapid egress of liquid through the metering port 319 back into the supply chamber 41a via the counterbore 305, passageways 307, 309 prevents premature relative movement of the control valve piston 130a, such resistance being supplemented by the preloaded strength of the valve return spring 150a. In this way, initial pedal depression is effective to move the tubular work-performing member PM relatively to the power piston assembly PP to take up the slack in the system and thus place the brake shoes in light contact with their respective wheel drums. With increasing pressure on the pedal at this point the dashpot continues to cooperate with the spring 150a to pressurize the liquid in the working chamber 121a of the master cylinder MC sufficiently to slow movement of the work member PM relatively to pedal movement with consequent yielding of the spring 150a with continued resistance from the pressurized condition of the liquid in the dashpot chamber 302. At this stage of initial brake-application, the operator is apprised of the inauguration of the power phase since the dashpot and spring 150a are reacting on the pedal in such manner that if the pedal movement is moderately rated, the mergence of the power phase with the initial operator movement is smoothly accomplished, but if the operator imparts a rapid or erratic initial movement to the pedal, the dashpot blocks relative movement of the control valve piston 130a irrespective of the preloaded weight of the valve return spring 150a, to prevent a sudden initial energization of the hydraulic motor HM with consequent "grabbing" or "locking" of the wheel brakes WB. Under these circumstances, the operator merely converts the pedal movement into pressurizing the liquid in the working chamber 121a and therefore, effects initial brake application in proportion to the speed of pedal movement until the dashpot chamber 302 can discharge the trapped liquid via the metering port 319, counterbore 305, and passageways 307, 309 back into the supply chamber 41a; but, if the operator gives the pedal a more slowed normal initial movement, the metering port 319 enables the trapped liquid in the dashpot chamber 302 to discharge substantially in proportion to pedal movement, the control valve piston 130a will interrupt the fluid circulating system FS to energize the hydraulic power-piston 70 in a gradually increasing rate to smoothly blend the power phase with the initial operator phase to produce smooth braking application through the full range of pedal movement. By virtue of the "blocking" action provided by the dashpot, fortuitous energization of the hydraulic motor HM is avoided, and a lighter valve return spring 150a may be used to render the present brake-booster apparatus A highly suitable for low-pedal control so that the operator may use a swinging movement of the foot from the heel engaging the floor in the driver's compartment, between the accelerator and brake pedals substantially in the same plane when in released positions. By using the toe portion of the foot, improved control action is provided with reduced effort, and safety of operation of the vehicle is enhanced as well by some reduction in the time required to apply pressure on the brake pedal.

When pressure is removed from the pedal P to take the brakes "off," valve piston spring 150a alone biases the control valve piston 130a toward its normally released position as shown in FIGURE 1, and this releasing operation is rapid to effect quick release of the brakes since the dashpot chamber 302 is refilled via the valve flange 317 unseated from its seat 304 which enables a much larger volume of fluid to re-enter the chamber 302 than that discharged through the metering port 319 during the brake-applying movement of the dashpot piston 301. A vacuum condition temporarily created in the dashpot chamber 302 unseats the valve element 311 against the force of its spring 318 to draw the fluid from the supply chamber 41a in such volume as to progressively refill the chamber 302 as it enlarges to normal size shown in this figure without restricting pedal movement as foot pressure is removed. Therefore, the valve return spring 150a effects withdrawal of the control valve piston 130a to its normal open position as shown in FIGURE 1, the spring being of such strength as to move the valve piston 130a in unison with the release of the pedal, and the open condition of the check-valve 311 enables ingress of fluid from the supply chamber 41a into the dashpot chamber 302 to bypass the metering port 319 so that the suction of the piston 301 induced by the valve return spring 150a progressively refills chamber 302 as rapidly as the pedal P is released to take the brakes "off."

Accordingly, it is seen from the foregoing description of this modification, that the dashpot arrangement DP serves a twofold purpose of transmitting operator force to initially apply the brakes if the speed of pedal movement is excessive, and a lighter valve return spring may be combined with the dashpot action to provide a lighter pedal operation favoring a low-pedal mechanism in which less mechanical advantage is provided over a normal height pedal.

Figure 8:
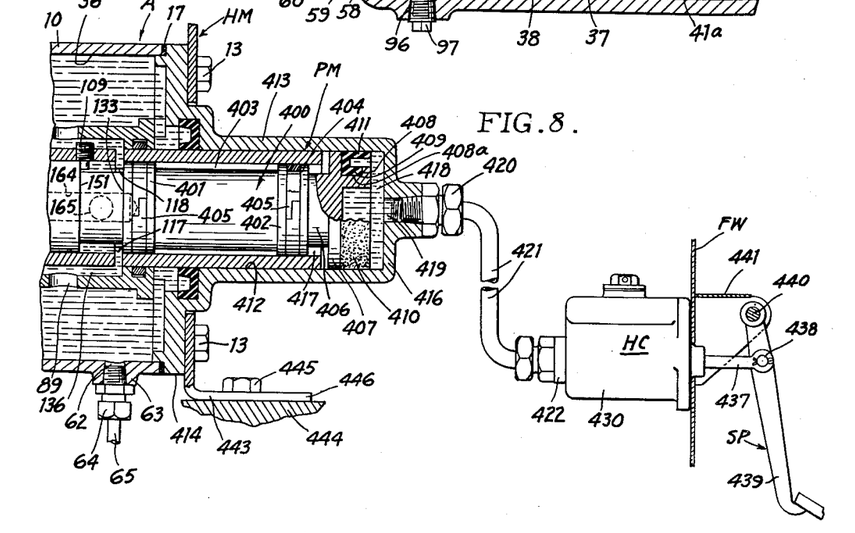
FIGURE 8 is a modification wherein a pedally-operated hydraulic master cylinder is utilized to actuate the control valve in lieu of the mechanical linkage system connected to the pedal to enable installation of the present invention remote from the pedal mounting.

Remote Hydraulic Control of Control Valve
(FIGURE 8)

FIGURE 8 discloses another modified form of my invention wherein hydraulic operating pressure is applied to the control valve piston 130 in lieu of the first disclosed mechanical pedal and push rod arrangement shown in FIGURES 1 and 2. The primary aim of this modification is to enable installation of the present hydraulic-booster apparatus A in locations on the vehicle other than the engine side of the vehicle firewall FW.

To this end, a modified control valve piston 400 is substituted for valve piston 130, and which is provided with a rearwardly projecting cylindrical portion having a pair of longitudinally spaced annular lands 401, 402 which define an annular ring-type relief space 403 therebetween. An annular groove 404 is provided in each land fitted with an overlapped end piston ring 405. A cylindrical reduced diameter extension 406 projects rearwardly from the land 402 in coaxial disposition with respect thereto and terminates in an enlarged diameter flange 407 of substantially the same diameter as said lands. This flange terminates in a reduced diameter annular flange 408 in spaced relation with respect to flange 407 to provide an external annular groove 408 therebetween. Groove 408 receives the inner lip 409 of a double-lip ring-type pliant seal 410, the outer lip 411 thereof effecting a liquid-tight seal with respect to a smooth cylindrical surface 412 of a cylindrical hydraulic motor casing 413 integrated at its open end with the central portion of a cover plate 414 which replaces the cover plate 12 previously disclosed. Operably projecting into this motor casing 413 are the rear end portions of the work member PM and the cylindrical portion of control valve piston 400, the motor cylinder 413 having its outer end closed by a wall 416 and the inner end open as aforesaid for slidable reception of the rear cylindrical portions of the control valve piston and work member aforesaid. The rear head end of the control valve piston 400 provides a variable power chamber 418 with respect to the end wall 416. Also a variable air chamber 417 is provided between the ends of the work member PM and cylindrical portion of the control valve piston 400 and confronting portion on the annular flange 407. This space encircles the reduced diameter extension 406 and is of sufficient size to enable the air trapped therein to slightly compress during relative operation of the valve piston 400 with respect to the confronting end of the work member PM without setting up appreciable resistance (dashpot effect) to such relative movement required to control energization of the hydraulic motor HM. Accordingly, during relative movement of the valve piston 400 the air confined in the chamber 417 slightly compresses and then relaxes to normal atmospheric pressure when pressure on the brake pedal P is removed. This slight "blocking" effect cooperates with the control valve piston return spring 150 to urge the valve piston and work member PM together to condition the working chamber of the master cylinder MC for operation to pressurize the liquid prior to the motor HM becoming operatively energized. However, if spring 150 is preloaded under the preloaded weight of spring 190, initial depression of the pedal P will move the valve piston 400 relatively to the work member PM thereby energizing the motor HM to assist in applying the brakes while the master cylinder MC is conditioned to develop pressure on the liquid by the initial movement of the work member by the motor piston 70 instead of the pedal. This latter spring arrangement is especially suited to low-pedal control which sacrifices some of the mechanical or leverage advantage provided by normal height pedals. The end wall 416 is centrally apertured at 419 for threaded reception of a bushing and nut connection 420 of a conduit 421 which leads to a discharge port 422 of the conventional firewall-mounted master cylinder generally designated "HC" operated, for example, from a suspended-pedal mechanism generally designated "SP." This master cylinder is provided with the usual spool-type piston, ring-type seals, return spring, residual pressure check-valve, pressure working chamber, compensating port controlled by the seal, intake port interconnecting an annular space on the piston between the seals with a liquid supply reservoir with which the compensating port is also in continuous communication. The piston carries a longitudinal bore close at its forward end against which the seal bears, and open at the other end through which a push rod 437 extends from the closed end to a pivotal connection at 438 with the pedal 439 which is pivotally supported at 440 on a member 441 fixed to the vehicle firewall FW whereby operator pressure applied to the pedal forces the piston 425 leftward into the master cylinder to pressurize the liquid in the working chamber 430 which is transmitted via the residual valve 429 through the discharge port via the conduit 421 into the power chamber 418 to actuate the control valve piston leftward to bring about the same control valve operations already described for the first disclosure (FIGURES 1–5) to control operative energization of the hydraulic motor HM. When the relative operating clearance aforesaid is fully taken up wherein the flange 407 engages the confronting end of the tubular member PM, the operator force exerted on the pedal is transmitted via the medium of the fluid in the chambers 430, 418 and conduit 421 and flange 407 to actuate the tubular member PM independently of or in unison with the hydraulic motor piston 70 to apply and release the brakes as is well understood, in cooperation with the energized condition of the piston 70 or in case of power failure independently thereof. The previously referred to cap screws 13 are employed to secure a mounting bracket 443 to the outer side of the cover plate 414 to support the motor HM in operating position on the vehicle at 444 as by a cap screw 445 projecting through a flanged portion 446 of the bracket.

Accordingly, this modification provides means for installing the present hydraulic-booster apparatus A on a suitable portion of the vehicle and operated remotely by the master cylinder HC, the latter also serving to maintain the hydraulic line 421 and power chamber 418 filled during release and applied braking operations by virtue of the well known functions of the compensating and intake ports aforesaid, while the residual pressure valve establishes a minimum pressurized condition on the fluid between the discharge port and the chamber 418 when the apparatus A is in normal released position shown in FIGURES 6–7.

The present modification, therefore, substitutes hydraulic means for the mechanical means of FIGURES 1–5 to control the operation of the actuator HM.

It should also be noted that the fluid circulating system FS is maintained filled by the liquid drawn from the pump sump 250, or maintained filled independently of the pump sump 250 by introducing liquid through the filler cap opening on top of the supply chamber 41. In this connection the invention contemplates elimination of the pump sump 250 in favor of the pump GP utilizing the supply chamber 41 as a source. In this latter arrangement, the intake conduit 251 would be connected directly to the interior of the supply chamber 41, otherwise the fluid circulating system FS would be the same as illustrated in FIGURE 1.

The present invention contemplates that the gear pump GP, disclosed as an example of one of several well known commercial types, may be driven from the engine of the vehicle or other drive components of the vehicle such as the tailshaft of the transmission, or the hydraulic motor may receive pressurized fluid directly from a centralized hydraulic pressure system which includes a hydraulic pressure accumulator charged by said pump for distribution of uniform pressures to operate other accessories and components of the vehicle such as the engine cooling fan, front seat adjustments, suspension system, radio antenna, and master clutch between the engine and transmission, etc.

While the booster brake mechanism A of the present invention is specifically applied to actuate the brakes on motor vehicles and the like, the hydraulic motor HM, aside from using it for the specific purpose herein disclosed, is capable of application in other uses, and therefore, such motor per se forms the subject-matter of certain claims appended hereto which in due course will be prosecuted in a divisional application if required.

Reference is now made to the terminology used in the foregoing description and in the appended claims in which identifying expressions and/or terms employed are intended to convey meanings which include the range of reasonable equivalents in the patent sense and in the light of the present contribution considered in relation to the state of the art. For example, the expressions "motor," "hydraulic motor," "power device," "apparatus," "actuator," "power assembly," "power piston," "hydraulic booster," "booster," "hydraulic cylinder," "power cylinder," etc., are intended to include any casing and/or chamber having a pressure-responsive movable assembly therein, whether such assembly included a solid piston or a flexible diaphragm, or some other member serving the same purpose, or whether the casing as a whole is detachably mounted on a member of the vehicle or the like or partially integrated therewith. The terms "front," "rear," "forward," "end," "bottom," "top," "right," "left," and other directional words or characters are intended to have only relative connotation for convenience in describing the structure as illustrated in the drawings, and are not intended to be interpreted as requiring any particular orientation with respect to associated structure external to the present disclosure or the illustrated operating position thereof.

Although three embodiments of my invention have been disclosed herein and which are believed well calculated to fulfill the objects above stated, it will be appreciated that I do not wish such to be limited to the exact construction and/or arrangement of parts shown, since it is evident that modifications, variations, changes and substitutions may be made therein without departing from the proper scope or fair meaning of the subjoined claims.

Having thus described my invention, I claim:

1. In braking apparatus and in combination, fluid-pressure-operated brakes, a brake fluid therefor, a normally non-activating fluid circulating system for said fluid including a pump for pressurizing said fluid and a fluid supply for said pump, a fluid-pressure-producing cylinder closed at one end and open at the other, a double-ended fluid-actuated power cylinder, a power member reciprocably mounted within the power cylinder and adapted to divide the interior thereof into a variable power chamber and a variable supply chamber; a normally preloaded compression spring operably disposed in the supply chamber to react between one end of the power cylinder and said power member to establish the latter in normally released position; an axially bored work-performing member actuatable in part by said power member, and having a portion reciprocably projecting into the pressure-producing cylinder to provide a variable pressure-working chamber therein between the closed end thereof and said work member, to pressurize the brake fluid; a discharge port through the closed end of said pressure-producing cylinder for the fluid in said pressure-working chamber; a power control valve including an element slidably disposed in a portion of the axial bore in said work member, and adapted to normally enable non-activating circulation of the fluid through both chambers in the power cylinder and return the same to the pump fluid supply, said control valve element having limited relative operating movement to interrupt the fluid circulating system to induce pressure build-up therein to an activating pressure status in the power chamber against the power member to actuate the latter; a removable filler cap normally closing an opening in the power cylinder, said opening communicating with the supply chamber to enable replenishment of fluid in the latter chamber; fluid passage means including an axial bore in said valve element adapted to interconnect said power and supply chambers; a reactive plunger slidably mounted in another portion of the axial bore in said work-performing member, one end of which being exposed to hydraulic pressure reaction from the pressure-working chamber aforesaid, and the other end coaxially engaging the said control valve element to move as a unit therewith; another normally preloaded compression operably disposed to react between said work-performing element and the control valve element to bias the latter toward its normal position; and an operator-operated member having a normally released position for controlling the element of said control valve and said reactive plunger simultaneously in opposition to reaction from said pressure-working chamber and last-mentioned spring, to interrupt the fluid circulating system.

2. In braking apparatus constructed in accordance with claim 1 in which the fluid circulating system comprises: a suction line interconnecting the inlet side of the pump with the fluid supply therefor; a pressure line interconnecting the outlet side of the pump with the power chamber in the power cylinder; a first check-valve having spring action in opposition to pressure delivery by the pump, and interposed in the pressure line to maintain the power chamber filled; a shunt return line interconnecting that portion of the pressure line between the first check-valve and outlet side of said pump with the fluid supply therefor; a pressure regulator valve having spring action toward closed position, and interposed in the shunt return line for establishing maximum pressure on the fluid delivered by the pump into the pressure line; another return line interconnecting the supply chamber in the power cylinder with the fluid supply for said pump; and a second check-valve having spring action toward closed position, and interposed in the other return line for maintaining a minimum (non-activating) pressure on the fluid in said supply chamber.

3. In braking apparatus constructed in accordance with claim 1 including in the combination: a counterbore in the control valve element merging with said axial bore therein; an annular valve seat provided at the juncture of said counterbore and last-mentioned axial bore; a check-valve element movably cooperating with said seat; and a third normally preloaded spring reacting between said control valve element and said check-valve element to bias the latter into seated relation with its seat to close said last-mentioned axial bore and thereby block fluid return from the supply chamber to the power chamber.

4. In braking apparatus and in combination, fluid-pressure-operated brakes, a brake fluid therefor, a normally non-activating fluid circulating system for said fluid including a pump having a fluid supply, and personally-operated means including a master cylinder for applying pressure to said brake fluid and an axially bored power-piston movable under the influence of pressure in said system to actuate said master cylinder in part, an axially bored work-performing element operable in part by said power-piston, and having a portion projecting into said master cylinder to pressurize the fluid therein, control valve means including an element movable in said axial bore to interrupt (close) the fluid circulating system to induce pressure build up therein against said power-piston, a reactive piston slidably disposed in the axial bore in the work element for receiving hydraulic reaction from the pressurized brake fluid in said master cylinder, mechanical linkage interconnecting said personal means with the valve element of the control valve means for transmitting operating force from the personal means to move said valve element, a normally preloaded compression spring operably incorporated between the valve element and work element for biasing the valve element to normal non-interrupting (open) position with respect to the work element, two pairs of alternately engageable abutment-engaging elements on the work element and element of the control valve means respectively for establishing the limits of relative operating movement therebetween to accommodate relative movement of said valve element to control energization of the power-piston, and means for introducing fluid into said fluid circulating system independently of said pump to replenish fluid loss from said system.

5. In hydraulic braking apparatus: a cylindrical casing closed at one end and open at the other, and containing a fluid; a stationary cylinder in the casing with a portion thereof immersed in the fluid therein; a closure for the outer end of the cylinder, the inner end of the cylinder being in free communication with the interior of the casing; a discharge port through the closed end of the cylinder; a power-piston assembly reciprocably mounted in the casing to divide the interior thereof into a variable hydraulic power chamber and a variable supply chamber; a tubular pressure-transmitting member having a forward portion projecting into the cylinder to define a variable pressure-working chamber with the closed end thereof; a filler opening for the supply chamber having a closure cap; a check-valve having a movable element for controlling a passageway through the cap to prevent fluid loss in consequence of fluid surge within said supply chamber; a fluid inlet through the wall of the casing to the pressure chamber; a fluid outlet through the wall of the casing from the supply chamber; coaxial fore and aft hollow hubs projecting from the central portion of the power-piston assembly; a longitudinal bore coextensive with said power-piston assembly and hubs, a fluid opening through the wall of the aft hub; an internal annular flange in circular alignment with the outer end of each hub; a circular groove in each hub flange for reception of a piston ring; a detachable cover plate for the open end of the casing; a counterbore centrally disposed in the inner side of the cover plate; an internal annular groove in the wall of said counterbore adjacent the outer end thereof; a double-lip ring-type pliant seal having inner and outer concentric sealing lips; the outer lip of said seal engaging the counterbore groove to maintain said seal in sealing position; an annular ring embossment centrally disposed on the inside of the cover plate opposite the end of the aft hub for engagement thereby to establish the power-piston assembly in its normal released position; a normally pre-loaded compression spring operably disposed in the supply chamber and reacting between the closed end of the casing and the power-piston assembly to bias the latter toward its normally released position; a rearwardly extending hub projecting coaxially from the exterior of said cover plate, a longitudinal bore through said last-mentioned hub merging with the counterbore aforesaid in coaxial disposition with respect thereto, said pressure-transmitting member having its rear portion slidably supported in and projecting through the longitudinal bore in the cover plate, and having a fluid-displacing portion extending forwardly through the longitudinal bore in the power-piston assembly into the working chamber of the stationary cylinder; a first and second counterbore in said tubular member defining a first internal annular shoulder therebetween; an axial bore terminating the forward portion of the tubular member; an intermediately disposed external annular flange on the tubular member engageable by the forward end of the fore hub for power-activation of the tubular member to pressurize the fluid in said working chamber and displace the same through said discharge port; a first annular fluid chamber defined by the fore and aft hub flanges and exterior of the cylindrical surface of the tubular member; fluid control openings through the wall of the tubular member communicating with the first counterbore; a plurality of fluid openings through the wall of the tubular member communicating with the first counterbore; a threaded hole through the wall of the tubular member intermediately disposed between the said control openings and plurality of openings; a fluid power control cylindrical valve element slidably disposed for limited movement in the first counterbore of the tubular member to interrupt (close) fluid circulation between the pressure and supply chambers aforesaid to control pressure buildup in the pressure chamber against the power-piston assembly to actuate the latter in a fluid pressurizing direction in opposition to the reaction from the power-piston assembly return spring; a pair of longitudinally spaced annular shoulders defining an annular channel in the valve element in circular alignment with said control openings for control by one of the shoulders defining said channel; a stop screw threaded into said threaded opening to a depth to lie in the path of the other annular shoulder of said annular channel to establish the normal released (open) position of the valve element with respect to the tubular member; an abutment-engaging element carried on the outer end of the valve element, and normally spaced from the confronting end of the tubular member to accommodate relative sliding movement of the valve element from normal (open) position to operating (closed) position defined by the abutment element substantially in engagement with the end of said tubular member; a medially disposed annular land on said valve element; a reduced diameter extension projecting forwardly from said land to provide an annular shoulder therewith; a second annular fluid chamber in the tubular member defined by the last-mentioned shoulder and the first internal annular shoulder aforesaid, said last-mentioned chamber communicating with the supply chamber via the fluid openings communicating with the said first counterbore; a plurality of ports through the wall of said valve extension communicating with the counterbore therein and second fluid chamber; a closure plug for the open end of said counterbore in the valve extension; a second internal annular shoulder defined by the juncture of the second counterbore and the axial bore in the tubular member; a third annular fluid chamber defined by the closure plug and second internal shoulder; a series of ports through the wall of the tubular member for accommodating fluid communication between the supply chamber and said last-mentioned fluid chamber; another normally preloaded compression spring operably disposed in the last-mentioned fluid chamber, said spring reacting between the second internal annular shoulder on the tubular member and the annular shoulder on the valve extension to bias the valve element toward its normally released position defined by said stop screw; a check-valve operably disposed in the counterbore of the valve extension, said check valve having spring action toward seated (closed) position; a valve seat with which the check-valve cooperates, an axial blind passageway in the valve element extending rearwardly from said valve seat; a cross passageway intersecting said last-mentioned passageway, and communicating with the first-mentioned annular channel; a reactive piston slidably disposed in the axial bore in the tubular member opposite the supported end of the latter, said reactive piston coaxially engaging the valve extension for movement therewith, the other end of said reactive piston receiving hydraulic reaction from the pressurized fluid in the aforesaid working chamber of the stationary cylinder; a third normally preloaded compression spring operably disposed in the working chamber aforesaid and normally reacting between the closed end of said stationary cylinder and the reactive piston and the portion of the tubular member projecting into the working chamber, in a pressure relieving direction only; and operator-operated means including a pedal mechanically linked to the outer end of the control valve element for imparting movement thereto to interrupt fluid circulation through the pressure and supply chambers aforesaid.

6. In hydraulic pressure-producing mechanism comprising: an operator-operated member having a normal released position; a normally non-activating fluid circulating system therefor including a pump having a fluid supply; a hydraulic master cylinder having a chamber for displacing fluid under pressure through a discharge port; a hydraulic power cylinder including a power member reciprocably mounted therein and having a normally released position defining a variable power chamber and a variable supply chamber on opposite sides respectively thereof; a compensating port normally open between the master cylinder chamber and said supply chamber; a fluid inlet for said power chamber; a fluid outlet for said supply chamber; an axially bored pressure-transmitting member engaging said power member with a portion thereof operably projecting into said master cylinder to sequentially close the compensating port and pressurize the fluid in the chamber thereof; control valve means including an element slidably disposed in the axial bore of said pressure member; fluid passageway means in the fluid circulating system between the power and supply chambers aforesaid controlled by the element of said control valve means whereby non-activating circulation of the fluid in the fluid circulating system via said power member is provided, said element being slidable relatively to the pressure member to interrupt the fluid circulating system to build up pressure therein to an activating condition in the power chamber against the power member to actuate the latter; a normally preloaded compression spring operably disposed between the element of the control valve means and the pressure member for separating them and accommodating their movement toward each other; a check-valve having spring action toward closed position operably incorporated in said fluid passageway means for maintaining the power chamber filled notwithstanding the system tends to cavitate during movement of the power member; a hydraulic plunger slidably disposed in the axial bore of the pressure member with one end subject to hydraulic reaction from the master cylinder chamber and the other end coaxially engaging the element of the control valve means for simultaneous movement therewith; a link interconnecting the operator member and element of the control valve means for slidably moving it and the plunger simultaneously to interrupt said fluid circulating system in opposition to the compression spring aforesaid; a removable filler cap incorporated in the power cylinder to enable replenishment of fluid in the fluid circulating system via the supply chamber; and two pairs of alternately engageable abutment-engaging elements carried on the pressure member and element of the control valve means respectively for establishing the relative operating movement therebetween.

7. A hydraulic pressure-producing mechanism according to claim 6 in which the power member comprises: oppositely disposed tubular extensions; a longitudinal bore coextensive with said extensions for slidable reception of said tubular member thereon; an internal annular flange at each end of said extensions, an internal annular groove in each flange for reception of a piston ring seal; a ring-type fluid chamber defined by said flanges, coextensive bore and outer cylindrical surface of said tubular member; a port through the wall of one of said extensions for maintaining the power chamber in communication with said ring-type fluid chamber; a fluid control opening through the wall of said tubular member for maintaining the ring-type fluid chamber in communication with the element of said control valve means; and an external annular shoulder on the tubular member for engagement by the end of the other extension to enable said power member to act on said tubular member in a pressurizing direction only.

References Cited in the file of this patent
UNITED STATES PATENTS

| | | |
|---|---|---|
| 2,130,799 | Hofstetter | Sept. 20, 1938 |
| 2,475,105 | Mitton | July 5, 1949 |
| 2,636,349 | Schnell | April 28, 1953 |
| 2,642,165 | Banker | June 16, 1953 |
| 2,685,172 | Price | Aug. 3, 1954 |
| 2,690,740 | Hupp | Oct. 5, 1954 |
| 2,770,949 | Randol | Nov. 20, 1956 |
| 2,775,957 | Anderson | Jan. 1, 1957 |
| 2,792,686 | Ingres | May 21, 1957 |
| 2,800,770 | Edge et al. | July 30, 1957 |
| 2,807,239 | Grant | Sept. 24, 1957 |
| 2,811,835 | Rike | Nov. 5, 1957 |
| 2,812,639 | Whitten | Nov. 12, 1957 |
| 2,844,941 | Ayers | July 29, 1958 |
| 2,902,829 | Verbrugge | Sept. 8, 1959 |
| 2,916,882 | Spalding et al. | Dec. 15, 1959 |

FOREIGN PATENTS

| | | |
|---|---|---|
| 172,797 | Austria | Oct. 10, 1952 |
| 747,273 | France | Mar. 28, 1933 |
| 13,290 | Germany | Oct. 31, 1956 |

UNITED STATES PATENT OFFICE
CERTIFICATE OF CORRECTION

Patent No. 3,046,746　　　　　　　　　　　　　　July 31, 1962

Glenn T. Randol

It is hereby certified that error appears in the above numbered patent requiring correction and that the said Letters Patent should read as corrected below.

Column 3, line 67, for "include" read -- including --; column 5, line 69, for "a" read -- the --; column 8, line 47, after "latter" insert -- member --; line 61, for "are" read -- is --; column 10, line 50, strike out "establish or"; column 13, line 69, for "180" read -- 183 --; column 16, line 33, for "are" read -- is --; line 34, for "a", second occurrence, read -- the --; column 17, line 53, after "130" insert -- to --; column 19, lines 23 and 24, for "extend" read -- extends --; column 22, line 9, for "close" read -- closed --; column 23, line 24, for "included" read -- includes --; column 26, line 54, for "cooperates," read -- cooperates; --.

Signed and sealed this 4th day of May 1965.

(SEAL)
Attest:

ERNEST W. SWIDER　　　　　　　　　　　　　　EDWARD J. BRENNER
Attesting Officer　　　　　　　　　　　　　Commissioner of Patents